(12) United States Patent
Koop et al.

(10) Patent No.: US 10,442,179 B2
(45) Date of Patent: Oct. 15, 2019

(54) 3D PRINTER WITH SPOOL AND MATERIAL CONTAINER

(71) Applicant: Stratasys, Inc., Eden Prairie, MN (US)

(72) Inventors: Shawn Michael Koop, Blaine, MN (US); Peter D. Schuller, Elko, MN (US); Jordan Paul Nadeau, St. Louis Park, MN (US); Samuel Ogrodnik, Minnetonka, MN (US)

(73) Assignee: STRATASYS, INC., Eden Prairie, MN (US)

( * ) Notice: Subject to any disclaimer, the term of this patent is extended or adjusted under 35 U.S.C. 154(b) by 317 days.

(21) Appl. No.: 15/237,149

(22) Filed: Aug. 15, 2016

(65) Prior Publication Data

US 2018/0043629 A1   Feb. 15, 2018

(51) Int. Cl.
| | |
|---|---|
| *B29C 64/118* | (2017.01) |
| *B29C 64/255* | (2017.01) |
| *B33Y 30/00* | (2015.01) |
| *B33Y 50/02* | (2015.01) |

(52) U.S. Cl.
CPC ............ *B33Y 50/02* (2014.12); *B29C 64/118* (2017.08); *B29C 64/255* (2017.08); *B33Y 30/00* (2014.12)

(58) Field of Classification Search
None
See application file for complete search history.

(56) References Cited

U.S. PATENT DOCUMENTS 4,290,223 A * 9/1981 Ostenberg .............. A01K 97/06
   43/54.1
4,788,787 A * 12/1988 Konietzki ........... A01M 31/008
   239/48

(Continued)

FOREIGN PATENT DOCUMENTS

WO   2016014543 A1   1/2016

*Primary Examiner* — Jacob T Minskey
*Assistant Examiner* — Baileigh Kate Darnell
(74) *Attorney, Agent, or Firm* — Westman, Champlin & Koehler, P.A.

(57) ABSTRACT

A 3D printer has a gantry configured to move in a plane substantially parallel to a build plane, and a platen configured to support a part being built. The platen is configured to move in a direction substantially normal to the build plane. A head carriage is carried by the gantry, and a print head is carried by and retained in the head carriage. A material container has a material container body and a material container cover configured to allow loading of a spool containing a supply of a consumable filament for printing with the 3D printer, the spool mounted on an axle containing a spool chip and electrical contacts. The material container body includes a first and second axle channels configured to accept first and second ends of the axle. The first axle channel has a number of electrical contacts and is tapered to orient the axle to align the axle contacts with the first axle channel contacts. A material well has first and second well edge landings at a first radius from the central longitudinal axis, the well edge landings extending toward each other from inner edges of the material well inwardly toward a center of the material well. An extension well extends laterally from the first and second well edge landings to a second radius larger than the first radius.

19 Claims, 17 Drawing Sheets

(56) References Cited

U.S. PATENT DOCUMENTS

| | | | |
|---|---|---|---|
| 5,939,008 A * | 8/1999 | Comb | B33Y 10/00 |
| | | | 264/308 |
| 6,004,124 A | 12/1999 | Swanson et al. | |
| 6,022,207 A | 2/2000 | Dahlin et al. | |
| 6,027,068 A * | 2/2000 | Lantsman | B23K 3/063 |
| | | | 226/187 |
| 6,722,872 B1 | 4/2004 | Swanson et al. | |
| 7,063,285 B1 | 6/2006 | Turley et al. | |
| 7,127,309 B2 | 10/2006 | Dunn et al. | |
| 7,341,214 B2 * | 3/2008 | Taatjes | B65H 49/322 |
| | | | 242/170 |
| 7,374,712 B2 | 5/2008 | Swanson et al. | |
| 7,604,470 B2 | 10/2009 | LaBossiere et al. | |
| 7,625,200 B2 | 12/2009 | Leavitt | |
| 7,938,351 B2 | 5/2011 | Taatjes et al. | |
| 7,938,356 B2 | 5/2011 | Taatjes et al. | |
| 8,439,665 B2 | 5/2013 | Batchelder et al. | |
| 8,985,497 B2 | 3/2015 | Mannella et al. | |
| 9,073,263 B2 | 7/2015 | Mannella et al. | |
| 2010/0096489 A1 * | 4/2010 | Taatjes | B65H 75/28 |
| | | | 242/520 |
| 2010/0243784 A1 * | 9/2010 | Johanson | B65H 49/322 |
| | | | 242/422.4 |
| 2010/0283172 A1 * | 11/2010 | Swanson | B29C 67/0055 |
| | | | 264/80 |
| 2013/0078073 A1 | 3/2013 | Comb et al. | |
| 2014/0158802 A1 | 6/2014 | Batchelder et al. | |
| 2015/0096717 A1 | 4/2015 | Batchelder et al. | |
| 2015/0097053 A1 | 4/2015 | Batchelder et al. | |

\* cited by examiner

3D PRINTER WITH SPOOL AND MATERIAL CONTAINER

BACKGROUND

The present disclosure relates to 3D printers for printing three-dimensional (3D) parts. In particular, the present disclosure relates to spools of material and material containers for additive manufacturing devices for printing 3D parts and support structures in a layered manner using fused deposition modeling techniques.

Additive manufacturing, also called 3D printing, is generally a process in which a three-dimensional (3D) object is built by adding material to form a 3D part rather than subtracting material as in traditional machining. One basic operation of an additive manufacturing system consists of slicing a three-dimensional computer model into thin cross sections, translating the result into two-dimensional position data, and feeding the data to control equipment which manufacture a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes. Using one or more additive manufacturing techniques, a three-dimensional solid object of virtually any shape can be printed from a digital model of the object by an additive manufacturing system, commonly referred to as 3D printer.

In a fused deposition modeling additive manufacturing system, a printed part may be printed from a digital representation of the printed part in an additive build style by extruding a flowable part material along toolpaths. The part material is extruded through an extrusion tip carried by a print head of the system, and is deposited as a sequence of roads onto a substrate. The extruded part material fuses to previously deposited part material, and solidifies upon a drop in temperature. In a typical system where the material is deposited in planar layers, the position of the print head relative to the substrate is incremented along an axis (perpendicular to the build plane) after each layer is formed, and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

SUMMARY

An aspect of the present disclosure is directed to a 3D printer having a gantry configured to move in a plane substantially parallel to a build plane, and a platen configured to support a part being built in a layer by layer process. The platen is configured to move in a direction substantially normal to the build plane. A head carriage is carried by the gantry, and a print head is carried by and retained in the head carriage. A material container includes a material container body and a material container cover. The material container body and material container cover are configured to allow loading of a spool containing a supply of a consumable filament for printing with the 3D printer, the spool mounted on an axle containing a spool chip and a plurality of electrical contacts. The material container body includes a first axle channel configured to accept a first end of the axle, and a second axle channel configured to accept a second end of the axle. The first axle channel has a different configuration than the second axle channel. The first axle channel has a plurality of electrical contacts and is tapered to orient the axle to align the axle the first axle channel contacts.

Another aspect of the present disclosure is directed toward a consumable assembly for a 3D printer. The assembly includes a spool and an axle. The spool has spaced apart spool walls, a hub, a filament winding area defined by the spool walls and the hub, and a central passage extending longitudinally through the hub. The axle is configured to be retained within the central passage, the axle insertable into the central passage in only one direction.

Another aspect of the present disclosure is directed toward a material container for a 3D printer. The material container includes a material container body and a material container cover. The material container body and material container cover are configured to allow loading of a spool containing a supply of a consumable filament for printing with the 3D printer, the spool mounted on an axle containing a spool chip and a plurality of electrical contacts. The material container body includes a first axle channel configured to accept a first end of the axle, and a second axle channel configured to accept a second end of the axle. The first axle channel has a plurality of electrical contacts and is tapered to orient the axle to align the axle contacts with the first axle channel contacts. A bottom of the first axle channel and a bottom of the second axle channel are configured to accept an axle therein and align the axle on a central longitudinal axis of the material container. The material container body further comprises a material well. The material well includes first and second well edge landings at a first radius from the central longitudinal axis. The first well edge landing extends from a first inner edge of the material well inwardly toward a center of the material well. The second well edge landing extends from a second, opposite, inner edge of the material well inwardly toward the center of the material well. An extension well extends laterally from the first and second well edge landings to a second radius larger than the first radius.

DEFINITIONS

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
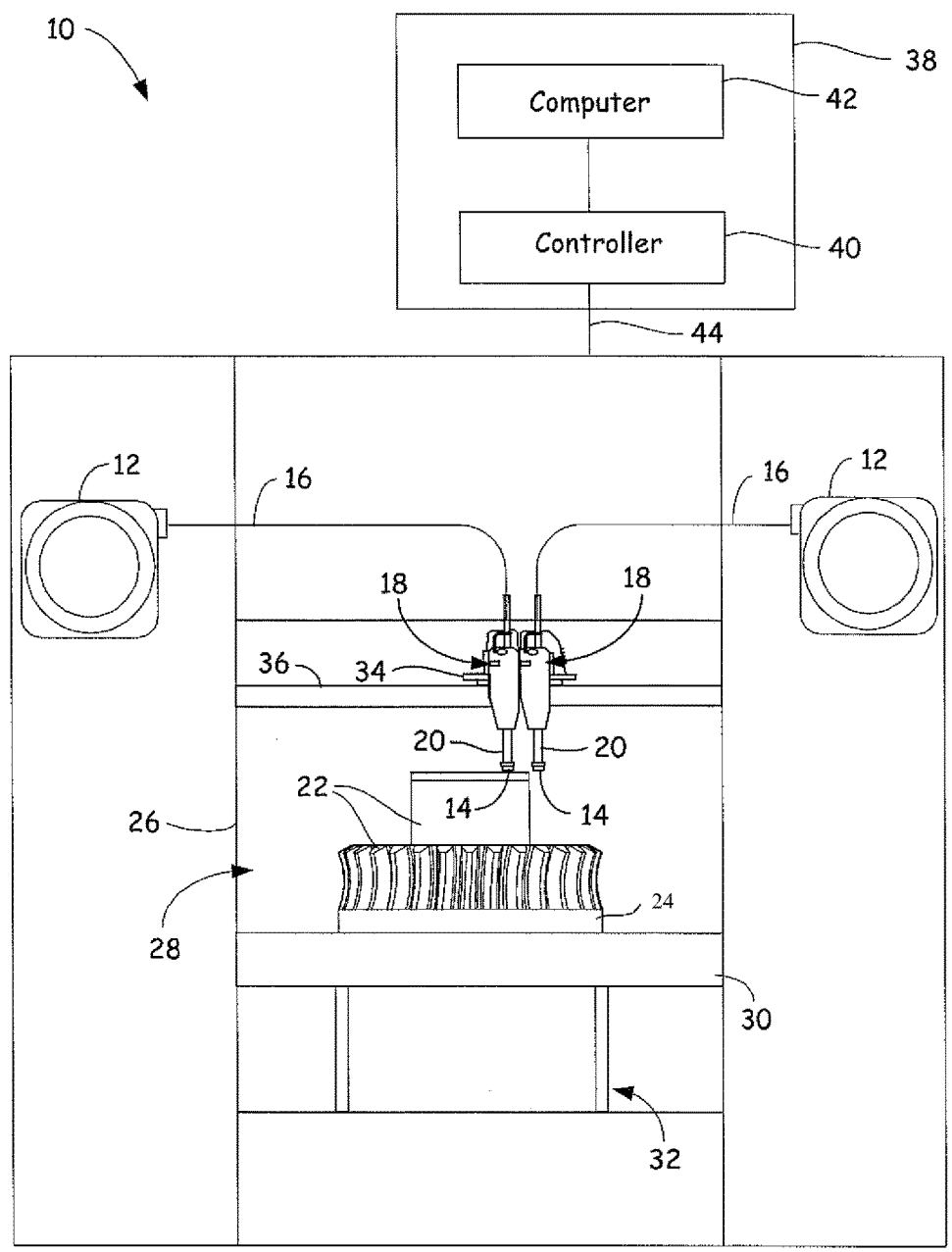
FIG. 1 is a front view of a 3D printer configured to print 3D parts and support structures with the use of one or more print heads of the present disclosure.

The present disclosure is directed to consumable assemblies containing a supply of consumable filament for use in material containers of an additive manufacturing device, commonly referred to as a 3D printer. The consumable assemblies feed filament from a spool in the material container to the 3D printer, and may include a spool chip for storing and updating data, specifications and other information about the filament wound on the spool. The data on a spool chip typically comprises nonexecuting code that includes information such as the amount of material in the cartridge, the type of material, and the batch number. The printer may interrogate the spool chip to verify the material, keep track of the length or volume of material withdrawn from the cartridge during printing, and write the new count back to the spool chip to update its information. The present disclosure is also directed to material containers for retention of spools and for feeding filament from the consumable assemblies.

Material spools have previously been provided for 3D printers in a variety of ways. For example, the spool may be provided with a spool chip affixed to the spool or spool hub, as is disclosed for example in U.S. Pat. No. 6,022,207, and shipped in a moisture-proof bag. The spool may be contained within a consumable assembly, and having a spool chip mounted to the consumable assembly, such as disclosed in U.S. Pat. No. 7,063,285. The spool may be assembled in a consumable assembly and further packaged with an associated print head, such as disclosed in U.S. Pat. No. 9,073,263.

Where a consumable assembly is used, it generally is provided by a supplier, installed by a user, and retained on the 3D printer during operation. The packaging in which the consumable assembly is shipped is either disposed upon installation to the 3D printer, is returned to the supplier for reuse, or is recycled or otherwise disposed of. Such shipping back and forth, or disposal of packaging material, is not cost effective.

Some consumable assemblies are provided as a spool of filament along with a separate device containing the spool chip, and through which the filament is initially fed, as is disclosed in U.S. Pat. No. 7,938,351. Following feeding of the filament through the component, the spool and component are arranged into a material container, and the material container is loaded into the 3D printer for operation. As the components containing the spool chip may all look alike, and as different filament materials may have different use specifications that are encoded on the spool chip, loss of an unattached chip component or accidental mismatching of a chip component with a material on a spool can cause part errors and/or inoperability of the consumable assembly.

Further, once a filament spool material is exposed to ambient conditions, the filament begins to take on moisture. As more moisture is absorbed, filament and part quality degrade. Therefore, many materials are packaged in water resistant packaging. Many of the previously used methods of providing the material spools for operation may be installed into a machine incorrectly, especially in light of the additional packaging to prevent moisture absorption. Incorrect installation can result in misfeeding of the filament, jamming or tangling of the filament, or the like. Further, if the filament material or container is installed incorrectly into the 3D printer, additional time may be used to correct the issue, leading to additional moisture absorption by the filament material. Still further, once a misfeed occurs, the typical solution for the issue is to return the material spool to the supplier, all of which uses additional time and money, both of which lead to inefficiencies in the additive manufacturing process.

Still further, spools that are situated in a container or other assembly typically have spool walls that have a gap between the exterior radial edge of the spool and the container.

Rotation of the spool with respect to the container can lead to filament being wedged into the gap, snagging the filament and stopping the ability of the 3D printer to continue operation. Further, any drag placed on the filament due to snagging or catching in gaps, such as those described, increases the pull force on the filament, which is problematic especially for 3D printers that pull the filament into a material liquefier.

Spools and material containers of the present disclosure are configured so that the spool can only be loaded properly into the material container. The spools and material containers of the present disclosure may be used with any suitable extrusion-based 3D printer, although some retrofitting may be required for existing systems. A newly manufactured 3D printer may be provided with the material containers, or an existing 3D printer that feeds filament may be retrofitted with the material containers for use of the consumable assemblies of the present disclosure.

The present disclosure may be used with any suitable extrusion-based 3D printer. For example, FIG. 1 illustrates a 3D printer 10 that has a substantially horizontal print plane where the part being printed in indexed in a substantially vertical direction as the part is printed in a layer by layer manner using two print heads 18. The illustrated 3D printer 10 uses two consumable assemblies 12, where each consumable assembly 12 is an easily loadable, removable, and replaceable container device that retains a supply of a consumable filament for printing with 3D printer 10. Typically, one of the consumable assemblies 12 contains a part material filament, and the other consumable assembly 12 contains a support material filament, each supplying material to one of the print heads 18. However, both consumable assemblies 12 may be identical in structure. Each consumable assembly 12 may retain the consumable filament on a wound spool, a spool-less coil, or other supply arrangement, such as discussed in Swanson et al., U.S. Pat. No. 7,374,712; Taatjes at al., U.S. Pat. No. 7,938,356; Mannella et al., U.S. Pat. Nos. 8,985,497 and 9,073,263; and Batchelder et al., U.S. Publication No. 2014/0158802.

Each print head 18 is an easily loadable, removable and replaceable device comprising a housing that retains a liquefier assembly 20 having a nozzle tip 14. Each print head 18 is configured to receive a consumable material, melt the material in liquefier assembly 20 to product a molten material, and deposit the molten material from a nozzle tip 14 of liquefier assembly 20. Examples of suitable liquefier assemblies for print heads 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in U.S. Patent Publications Nos. 2015/0096717 and 2015/0097053; and in PCT publication No. WO2016014543A.

Guide tubes 16 interconnect consumable assemblies 12 and print heads 18, where a drive mechanism of print head 18 (or of 3D printer 10) draws successive segments of the consumable filament from consumable assembly 12, through guide tube 16, to liquefier assembly 20 of print head 18. In this embodiment, guide tube 16 may be a component of 3D printer 10, rather than a sub-component of consumable assemblies 12. In other embodiments, guide tube 16 is a sub-component of consumable assembly 12, and may be interchanged to and from 3D printer 10 with each consumable assembly 12. During a build operation, the successive segments of consumable filament that are driven into print head 18 are heated and melt in liquefier assembly 20. The melted material is extruded through nozzle tip 14 in a layerwise pattern to produce printed parts.

3D printer 10 prints 3D parts or models and corresponding support structures (e.g., 3D part 22 and support structure 24) from the part and support material filaments, respectively, of consumable assemblies 12, using a layer-based, additive manufacturing technique. Suitable 3D printers for 3D printer 10 include extrusion-based systems developed by Stratasys, Inc., Eden Prairie, Minn. under the trademark "FDM".

As shown, 3D printer 10 includes system casing 26, chamber 28, platen 30, platen gantry 32, head carriage 34, and head gantry 36. System casing 26 is a structural component of 3D printer 10 and may include multiple structural sub-components such as support frames, housing walls, and the like. In some embodiments, system casing 26 may include container bays configured to receive consumable assemblies 12. In alternative embodiments, the container bays may be omitted to reduce the overall footprint of 3D printer 10. In these embodiments, consumable assemblies 12 may stand proximate to system casing 26, while providing sufficient ranges of movement for guide tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18, and is supported by head gantry 36. Head carriage 34 preferably retains each print head 18 in a manner that prevents or restricts movement of the print head 18 relative to head carriage 34 so that nozzle tip 14 remains in the x-y build plane, but allows nozzle tip 14 of the print head 18 to be controllably moved out of the x-y build plane through movement of at least a portion of the head carriage 34 relative the x-y build plane (e.g., servoed, toggled, or otherwise switched in a pivoting manner).

In the shown embodiment, head gantry 36 is a robotic mechanism configured to move head carriage 34 (and the retained print heads 18) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Publication No. 2013/0078073, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), capstans, pulleys, belts, screws, robotic arms, and the like.

In an alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis.

System 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to 3D printer 10.

Controller assembly 38 may communicate over communication line 44 with print heads 18, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also direct print heads 18 to selectively draw successive segments of the consumable filaments from consumable assemblies 12 and through guide tubes 16, respectively.

While FIG. 1 illustrates a 3D printer 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1. Rather, the present disclosure including the coupling of the print head(s) 18 to head gantry 36 can be utilized with any 3D printer, including, but not limited to, printing in a substantially vertical print plane and moving the platen in a direction substantially normal to the substantially vertical print plane.

While FIG. 1 illustrates a 3D printer 10 that utilizes a build chamber 28 that can optionally be heated to a selected temperature, the present disclosure is not limited to a 3D printer with a heated chamber or a chamber. Rather, the present disclosure utilizing the retaining mechanism and the print head(s) 18 can be utilized with any 3D printer, including, but not limited to, 3D printers that utilize an unheated chamber or an out of oven 3D printer. Otherwise stated, the retaining mechanism utilized to secure the print head(s) 18 to the head gantry 36 can be utilized on any extrusion-based 3D printer.

Whatever 3D printer is utilized, embodiments of the disclosed material spools, axles, and material containers may be used in a filament based 3D printing system.

Figure 2:
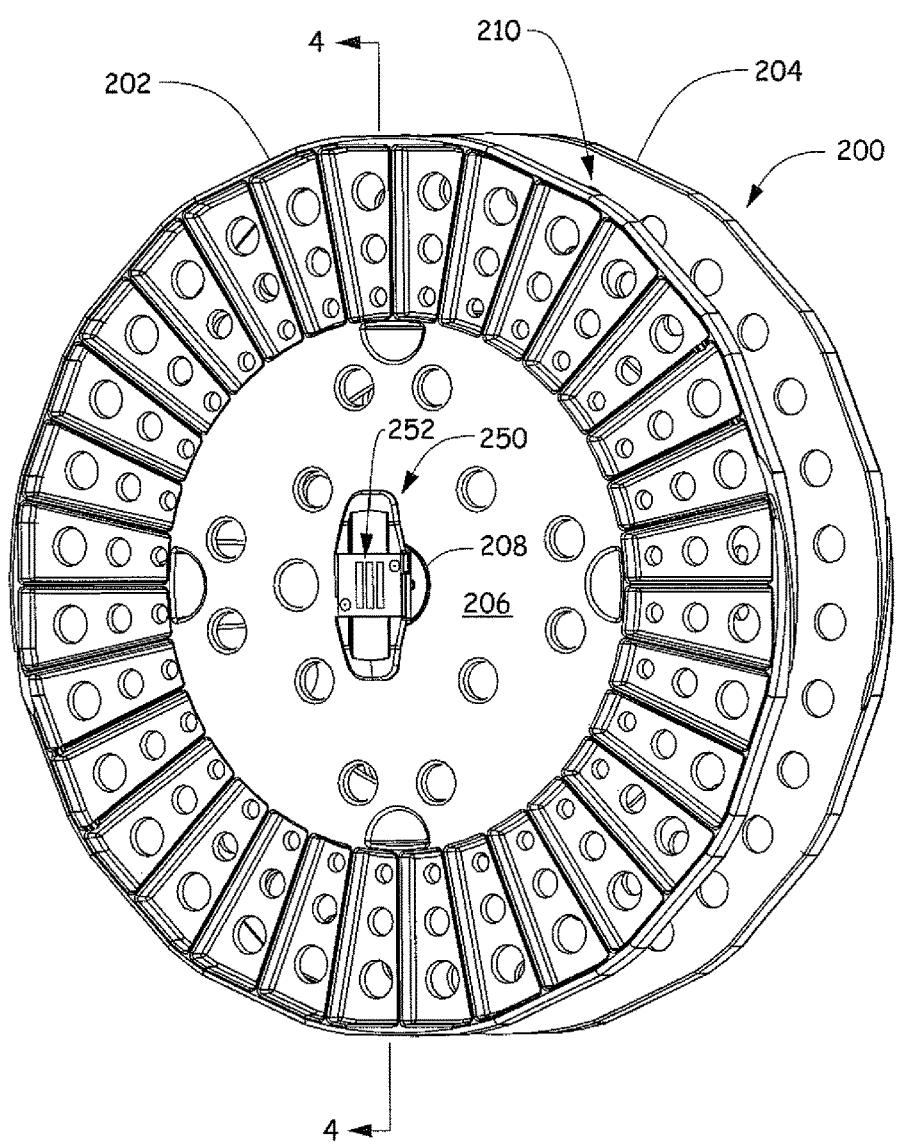
FIG. 2 is a perspective view of a spool and axle assembly according to an embodiment of the present disclosure.
Figure 3:
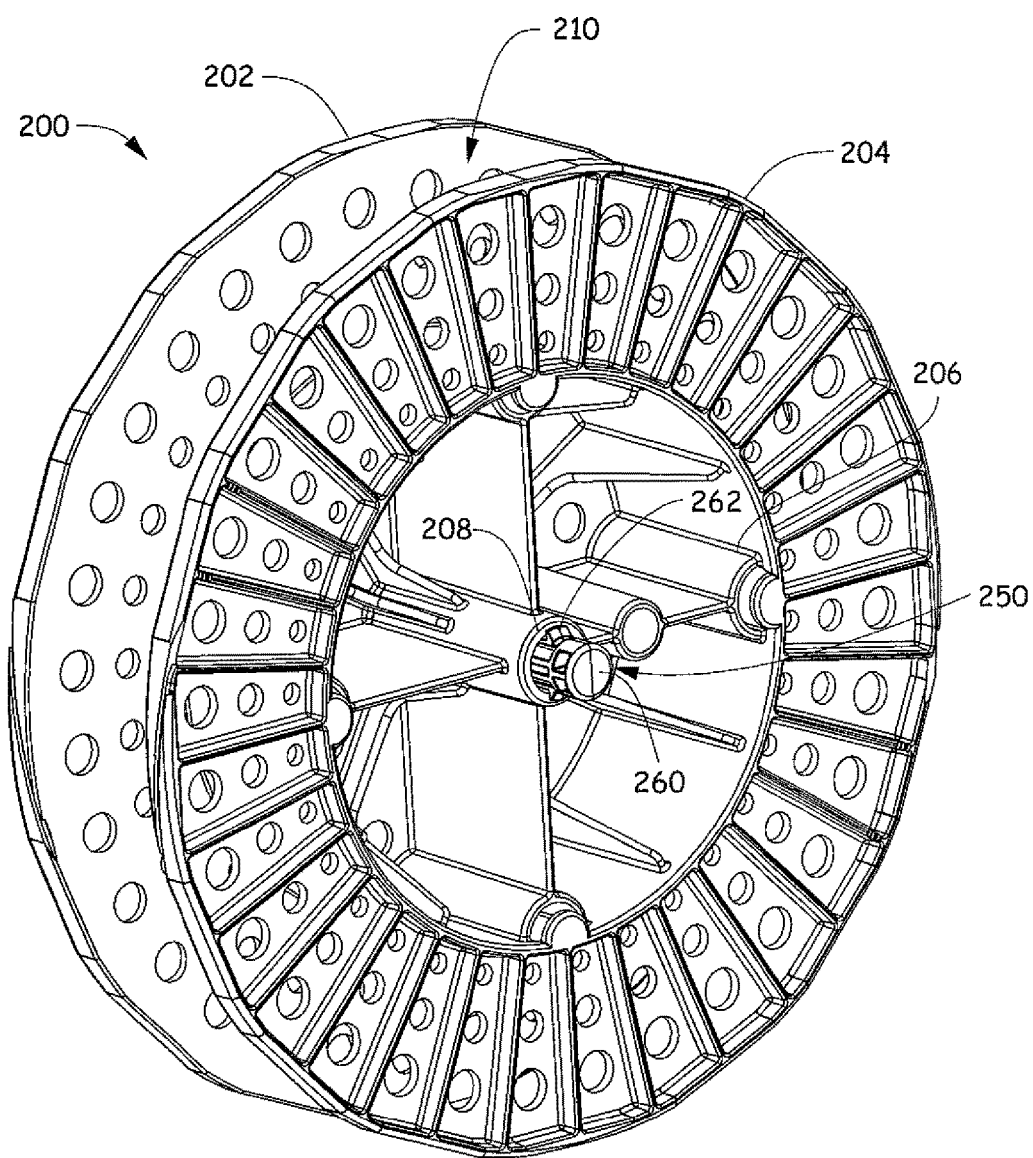
FIG. 3 is a perspective view of an opposite side of the spool and axle assembly of FIG. 2.
Figure 4:
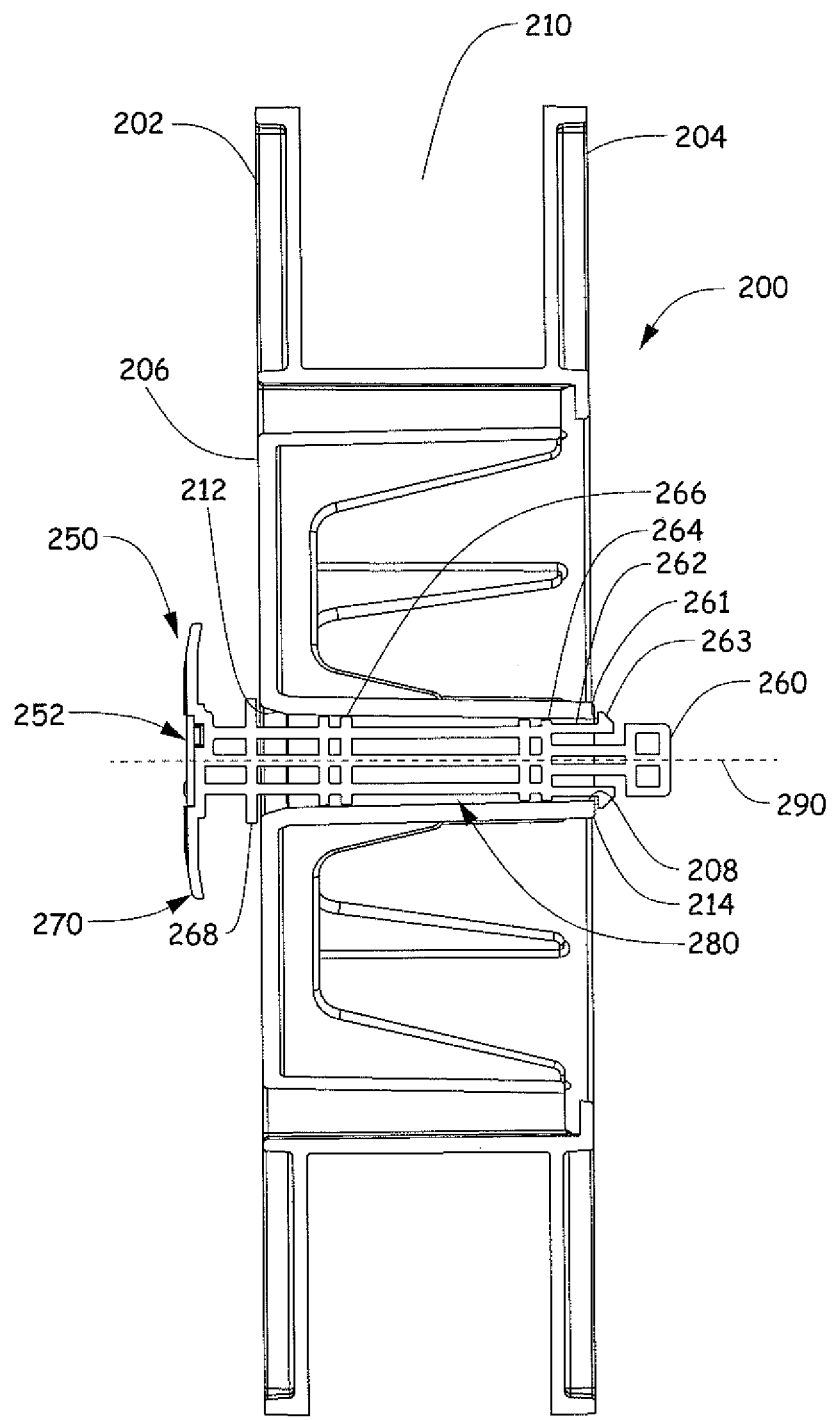
FIG. 4 is a section view of the spool and axle assembly of FIG. 2 along section line 4-4.

Consumable assemblies such as consumable assembly 12 as shown in FIG. 1 comprise in one embodiment of the present disclosure, illustrated in FIGS. 2, 3, and 4, a spool 200 and axle 250. Spool 200 comprises a pair of spool walls 202 and 204 extending radially from a center hub 206. Center hub 206 has a passage 208 therethrough for the insertion of axle 250. Area 210 is provided between spool walls 202 and 204, and hub 206, for the winding of material (e.g., filament, not shown) onto spool 200. Axle 250 carries a spool chip 252 that contains information on the material loaded on the spool 200, such as by way of example and not by way of limitation, material type, feed rate speed and processing temperatures, authentication of genuine material, and the like. Axle 250 may be inserted into hub passage 208 of hub 206 in only one direction, in this embodiment as shown through the passage 208 from spool wall 202 to spool wall 204. In order to prevent insertion of the axle 250 into spool 200 incorrectly, the geometry of passage 208 and axle 250 is such that an attempt to insert axle 250 into passage 208 from spool wall 204 will be unsuccessful. FIGS. 2 and 3 are perspective views of spool 200 and axle 250 looking at spool walls 202 and 204, respectively.

FIG. 4 is a section view of spool 200 and axle 250 along section line 4-4 of FIG. 2, where the geometry of axle 250 and spool passage 208 are shown in greater detail. Axle 250 in one embodiment includes a cross section with end 270 and longitudinal body 280 extending substantially perpendicular to one another. Longitudinal body 280 includes end 260 and elements 262, 264, 266, and 268 (see also FIGS. 5, 6, 7). End 260 is may be inserted in passage 208 at tapered end 212 of passage 208. End 260 of axle 250 has, in one embodiment, opposed flexible fingers 262 with extensions 263 that form a shoulder 261. As the axle 250 is inserted into the passage 208, the fingers 262 flex toward each other due to the narrowing of the passage 208. When the extensions 263 pass the end 214, the fingers 262 flex away from each other, resulting in the shoulder 261 engaging the end 214, which retains the axle 250 to the spool 200.

Bearing surfaces 264 and 266 of axle 250 have diameters that are successively larger than end 260. Spool 250 rotates about axle 250, and the bearing surfaces 264 and 266 are configured so as to provide support for the spool 200 via tapered passage 208. Axle element 268 engages with end 212 of passage 208 as flexible fingers 262 engage opposite end 214 of passage 208 to removably secure axle 250 into passage 208 of spool 200.

If an attempt is made to insert axle 250 into spool 200 passage 208 from spool wall 204, the diameter of bearing surface 264 prevents the insertion. In this manner, axle 250 may only be inserted into passage 208 in the correct way.

Figure 5:
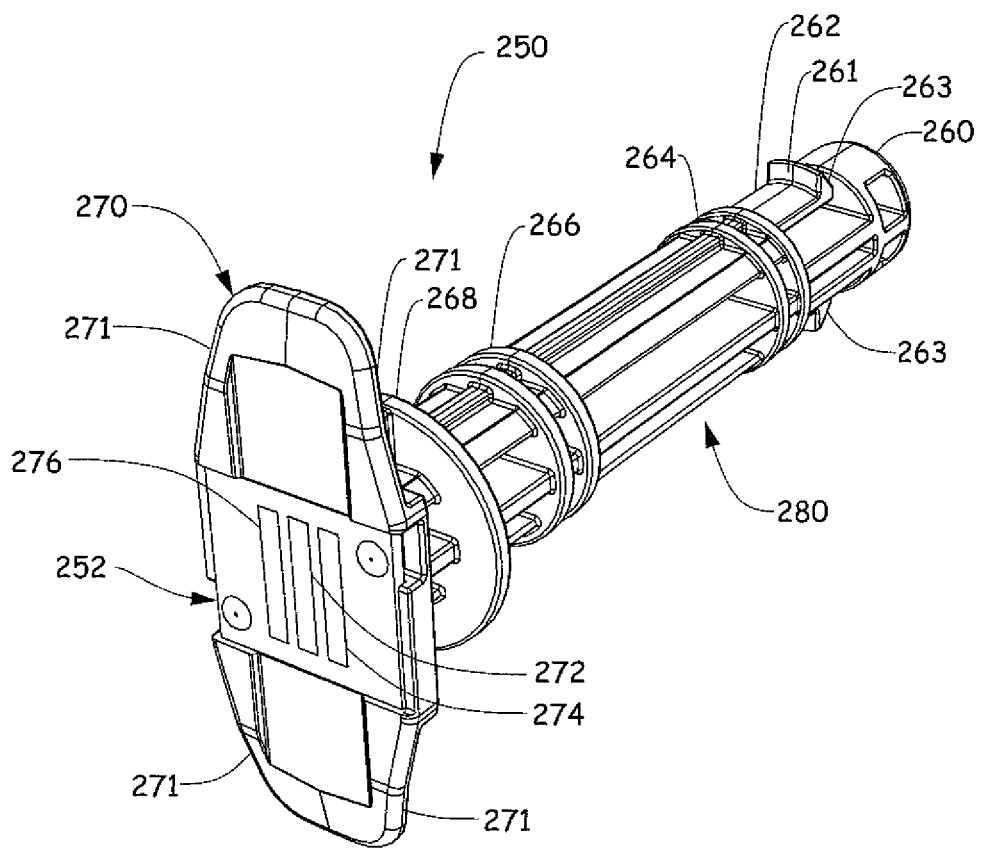
FIG. 5 is a perspective view of an axle according to an embodiment of the present disclosure.
Figure 6:
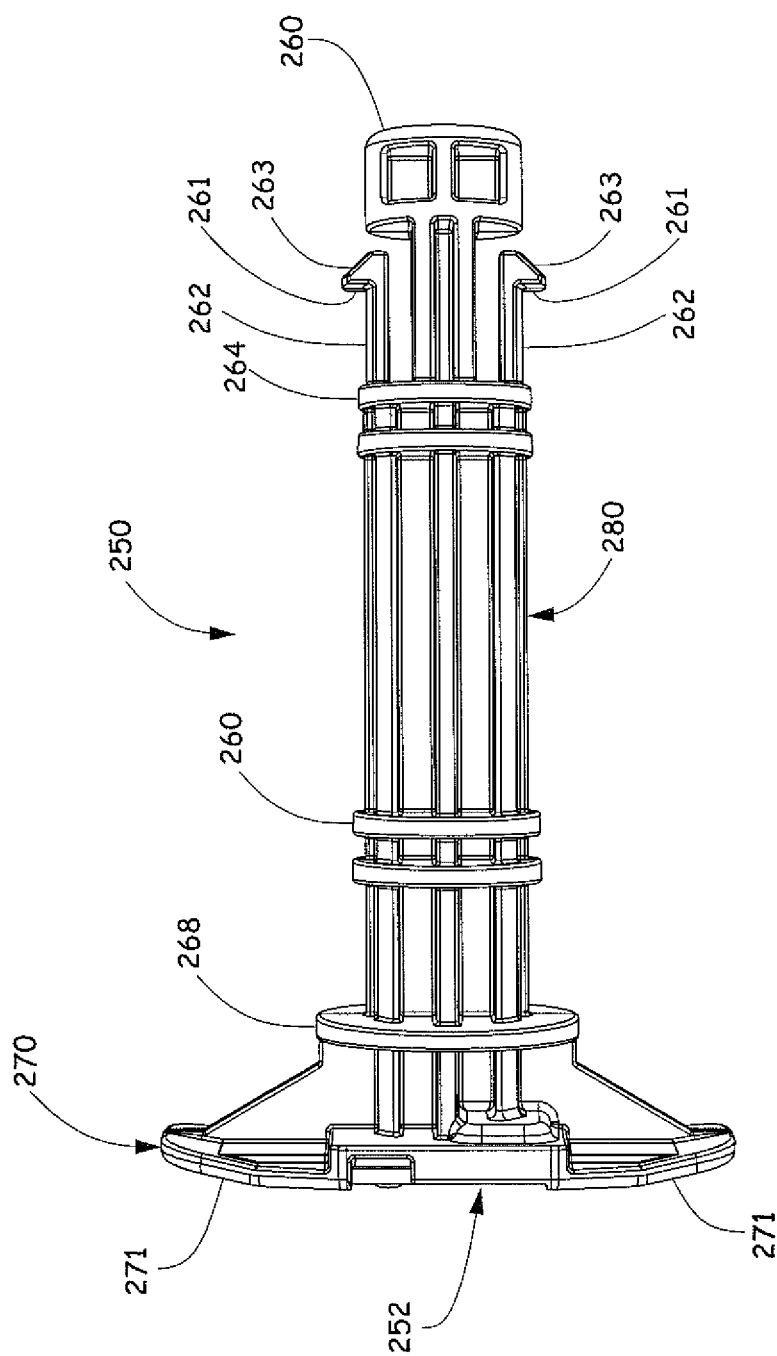
FIG. 6 is a side elevation view of the axle of FIG. 5.
Figure 7:
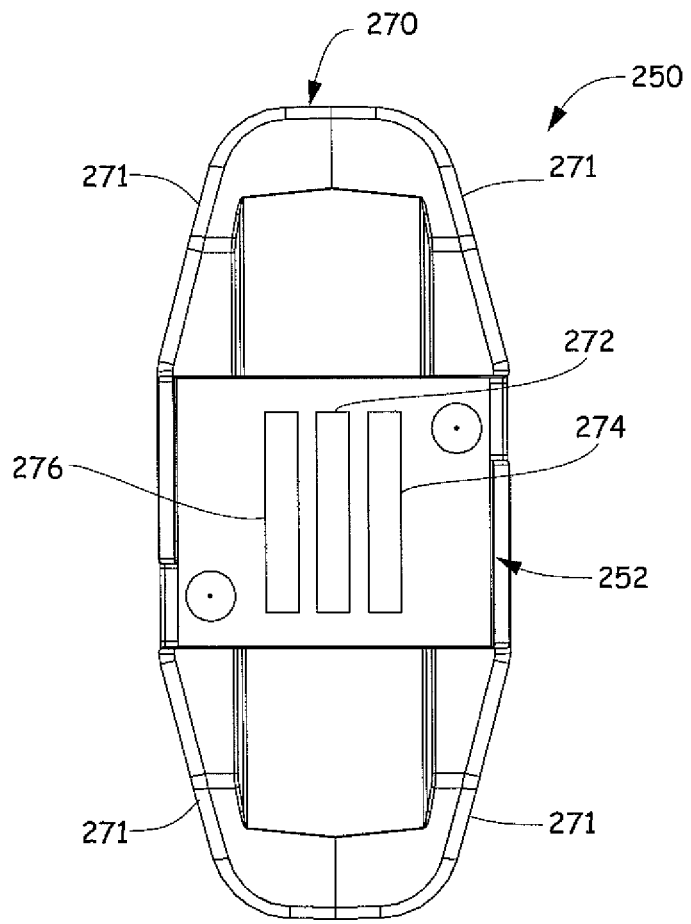
FIG. 7 is an end elevation view of the axle of FIG. 5.
Figure 8:
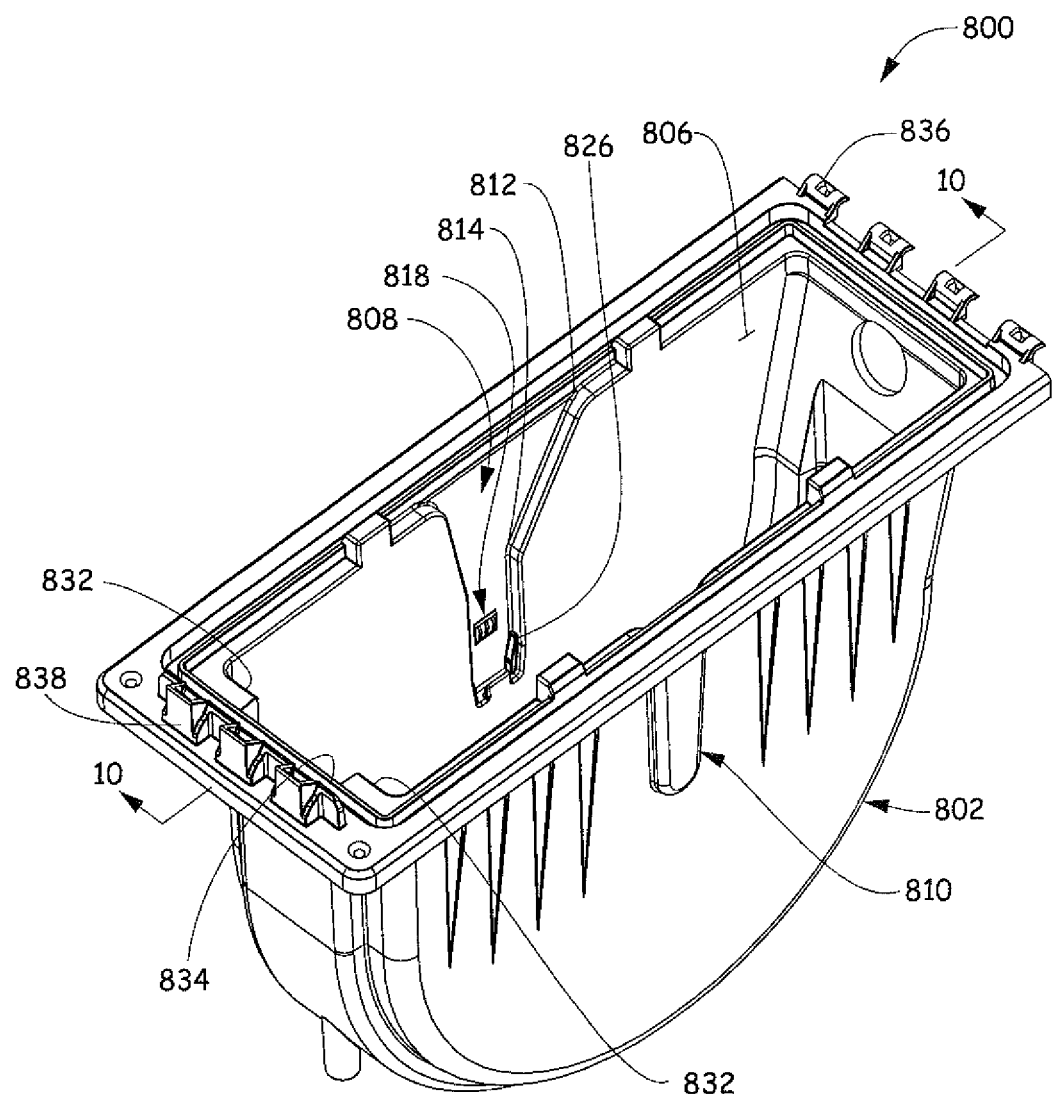
FIG. 8 is a perspective view of a material container body according to an embodiment of the present disclosure.

Further detail of axle 250 is shown in FIGS. 5, 6, and 7. Spool chip 252 is mounted on end 270 of axle 250. In one embodiment, end 270 is substantially perpendicular to longitudinal extension 280. Spool chip 252 electrically couples with spool 250 using a plurality of electrical contacts 272, 274, and 276. The electrical contacts 272, 274, and 276 are arranged so that insertion of the axle 250 and spool 200 into a material container body aligns the electrical contacts 272, 274, and 276 with corresponding contacts in the material container body.

The spool chip 252 uses two wire communication. In one embodiment, contact 272 is configured to by a ground contact, and contacts 274 and 276 are electrically connected and are configured to carry power and/or control signals. Therefore, inserting the axle 250 and spool 200 into a material container body may be done from either orientation of the end 270 to the material container body, and electrical contact will be made with corresponding contacts in the material container body (discussed below). It should be understood that additional orientations of contacts, including more or fewer contacts, could be employed without departing from the scope of the disclosure. For example only, a concentric, target type, configuration of contacts may be used, with a ground contact located at a center or bulls eye of the target, and power contact as a ring around the center of bulls eye. Such configurations will be apparent to those of skill in the art, and are within the scope of the disclosure.

The spool 200 and axle 250 are positionable into material container 800 as shown in FIGS. 8-14. Material container 800 is shown in perspective view in FIG. 8. Material container 800 comprises in one embodiment a material container body 802 and a material container cover 804 (shown in greater detail in FIGS. 12-14). Material container body 802 includes material well 806 into which spool 200 and axle 250 are inserted for feeding filament to the additive manufacturing device. Material container body 802 further comprises, in well 806, first axle channel 808 and second axle channel 810, on opposite sides of the material container 800 in material well 806. First axle channel 808 accepts and orients axle 250 at its end 270. First axle channel 808 has a top opening 812 sized to accommodate the end 270 of axle 250 independent of the orientation of the axle 250 at the top opening 812. First axle channel 808 tapers from top opening 812 to a second slot width at 814 at which slot 808 has a width equal to the smallest width of the end 270. The bottom portion 816 of first axle channel 808 that accommodates an axle such as axle 250 has a contact pad 818 having center electrical contact 820 that is configured to be a ground contact, and side electrical contacts 822 and 824. Side electrical contacts 822 and 824 are electrically connected and are configured in one embodiment to carry power and/or signal. The electrical contacts 820, 822, and 824 correspond with electrical contacts 272, 274, and 276 of axle 250. Tabs 826 on either side of axle channel 808 near the bottom thereof are configured to engage tapered edges 271 of the end 270 to aid in proper alignment of the end 270 of the axle 250 within the first axle channel 808.

Figure 9:
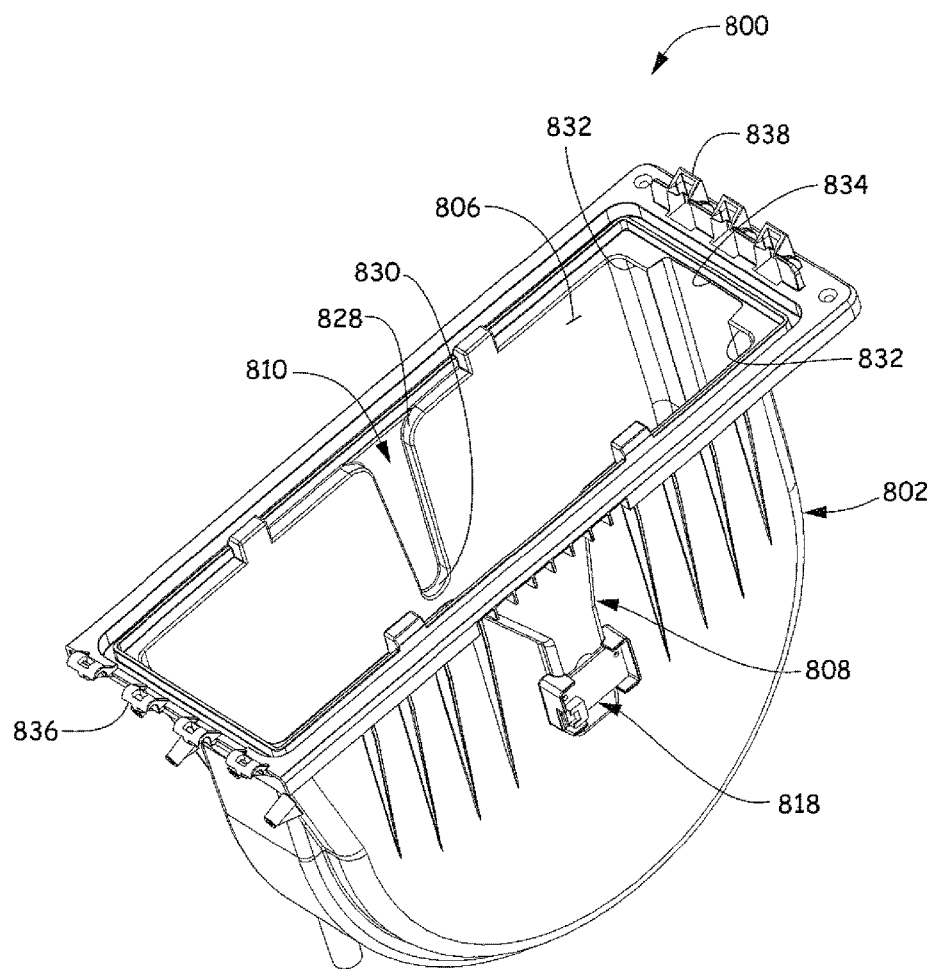
FIG. 9 is a perspective view of the material container body of FIG. 8 from its opposite side.
Figure 10:
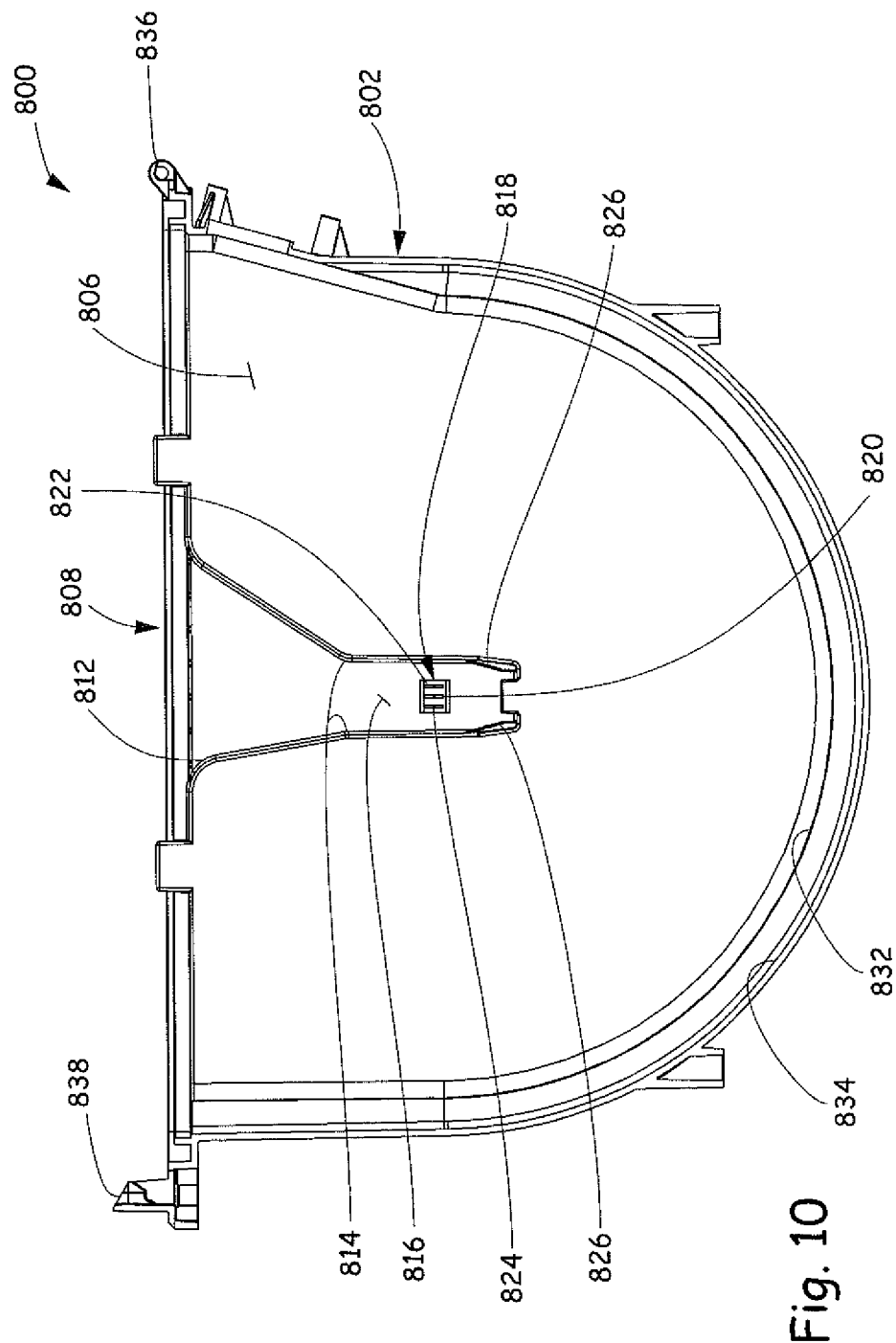
FIG. 10 is section view of the material container body of FIG. 8 taken along section line 10-10.
Figure 11:
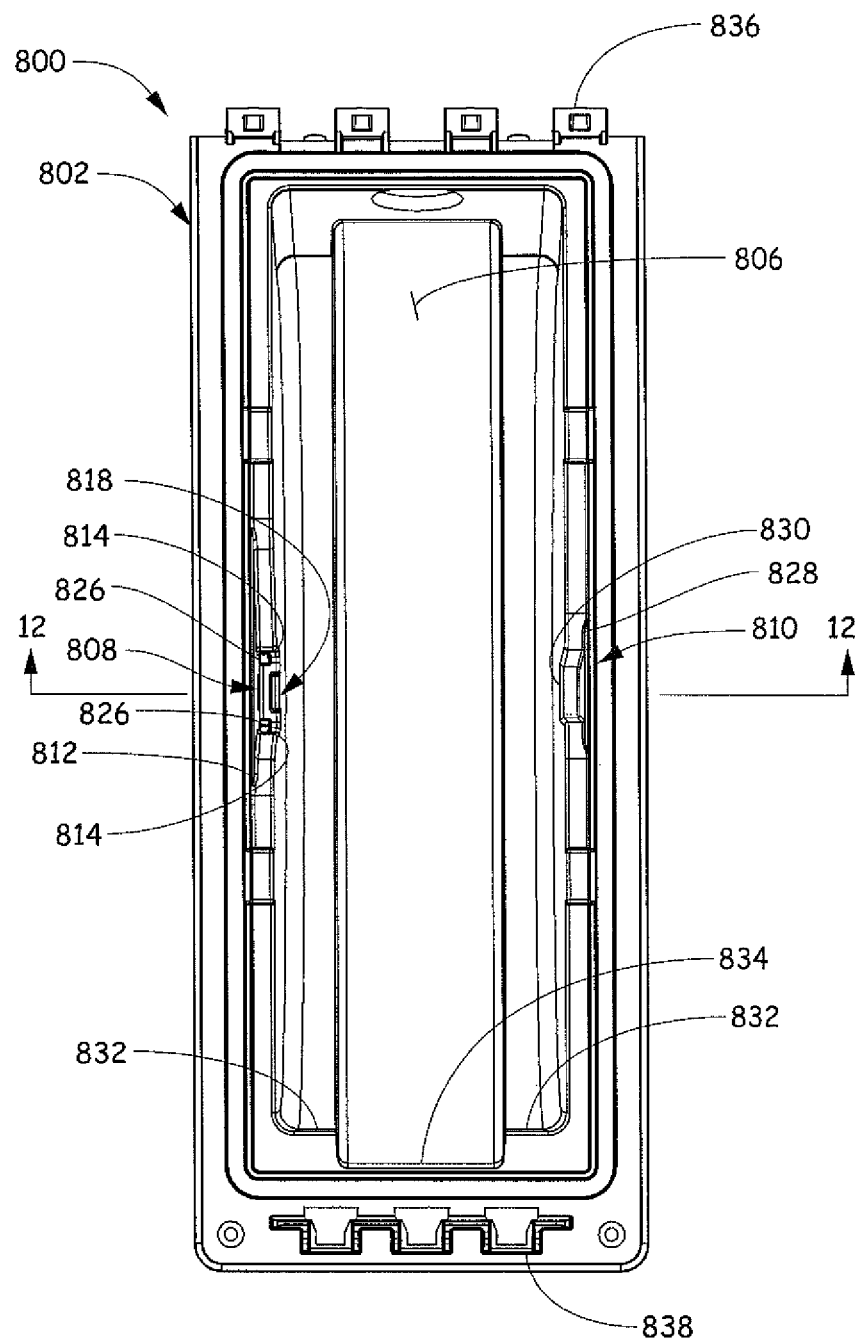
FIG. 11 is a top view of the material container body of FIG. 8.

FIG. 9 illustrates material container 800 in perspective view from an opposite side of the material container 800. In FIG. 9, second axle channel 810 is sized at its top opening 828 so that end 260 of axle 250 is positionable within the second axle channel 810, but end 270 of axle 250 will not fully engage second axle channel 810. A bottom 830 of second axle channel 810 is rounded to accept the rounded end 260 of axle 250. In this embodiment, any insertion of the axle 250 and spool 200 into the material container 800 will only allow proper orientation of the axle 250 and spool 200, that is, with axle end 270 in first axle channel 808 and axle end 260 in second axle channel 810. When a spool 200 and axle 250 are inserted into the material container 800 in the proper orientation, a central longitudinal axis 290 of the axle 250 intersects a center of the contact pad 252 to ensure proper contact. The ends 270 and 260 of the axle 250 seat in the first 808 and second 810 axle channels, and the electrical contacts 272, 274, and 276 align with the electrical contacts 820, 822, and 824 of the first axle channel 808. The central longitudinal axis of the axle 250 aligns with the central longitudinal axis 290 of the material container when the axle is properly situated in the material container body 802. FIG. 10 is a section view showing additional detail of the first axle channel 808 including opening 812 and second width 814, alignment tabs 826, and contact pad 818.

In some instances, filament can jump off the spool and into a gap between the spool and the well. The filament then can get wrapped around the axle, for example in situations in which slack is introduced into the filament through inertia of the spool continuing to feed filament even when feed has been halted, incorrect filament loading that introduces uneven tension, unloading and attempted reload, and the like.

Embodiments of the present disclosure provide geometries of the material container body and the material container cover to reduce jamming of filament, such as filament being wedged into a gap between the spool and the container in which the spool is placed for filament feeding. One embodiment of material container 800 includes material well 806 with well ledge landings 832 that are positioned so as to make a gap 844 (see FIG. 16) between an outer radial end of the spool walls 202 and 204 smaller than a diameter or thickness of the filament, reducing the chances of filament jumping off the spool and into the gap 844 as the spool rotates to feed filament. The well edge landings 832 extend inwardly from opposite inner edges of the material container body 802 at a first radius from the central longitudinal axis 290 of the material container 800. In one embodiment, the first radius is substantially equal to a radius of an inserted spool, such as spool 200. Further, material container 800 includes an extension well 834 that has a larger radius than the well ledge landings 832 adjacent to the filament winding area where filament is wound and where filament can jump into the gap 844 during rotation of the spool 250. In one embodiment, the extension well 834 has a width configured to be substantially the same as a width of the filament winding area 210 of an inserted spool 200. The extension well 834 has a second, different radius from the central longitudinal axis 290 of the material container 800 than the first radius of the well edge landings 832. First radius is shown as radius 848 in FIG. 17, and second radius is shown as radius 850 in FIG. 17.

Figure 12:
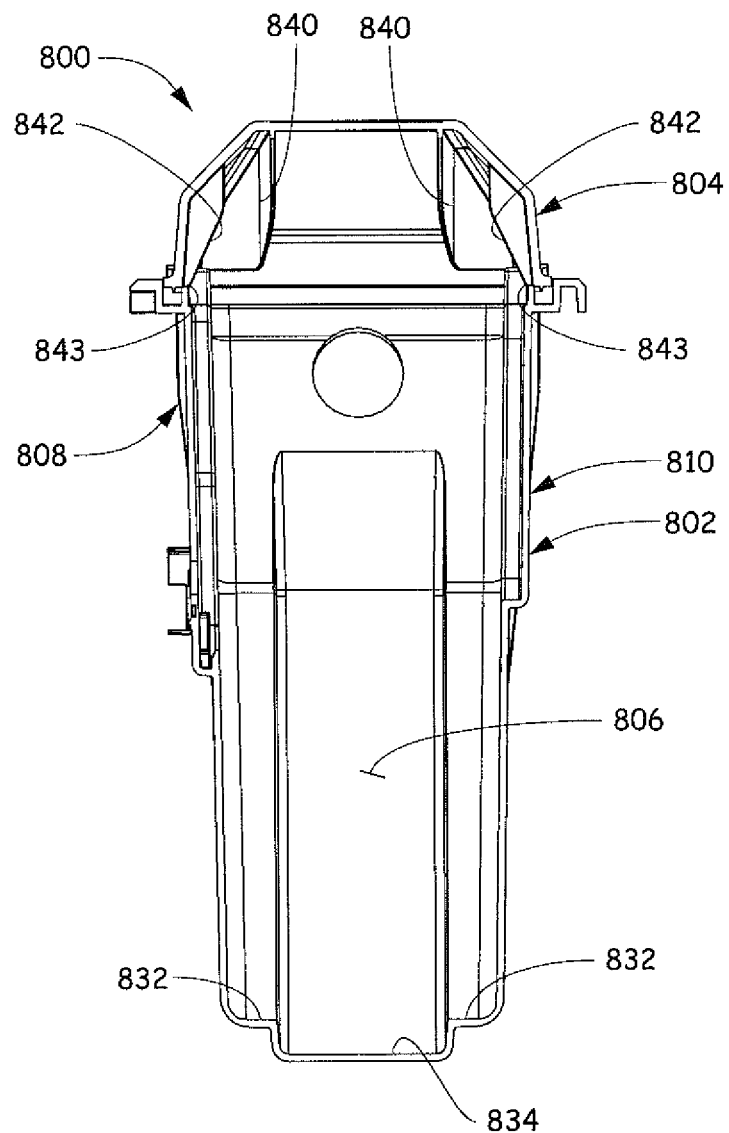
FIG. 12 is a section view of the material container body of FIG. 11 taken along section line 12-12, and showing a material container cover.

When filament becomes slack, the filament moves in a direction of least resistance. In this embodiment, the direction of least resistance is into the extension well 834 instead of into the gap 844. This reduces the chances of any snagging of filament in gap 844, and of any jumping of filament from the gap 844 and to the exterior of the spool 200 where it can wind around axle 250 and jam the filament feed. This reduction of jamming and snagging increases filament feed reliability. FIG. 12 illustrates a section view of material container 800 with material container body 802 and material container cover 804 taken along section line 12-12 of FIG. 11. Material container cover 804 is rotatably coupled to material container body 802 via hinges 836, and in one embodiment, is snapped closed with hinges 838 and a latch (not shown).

Figure 13:
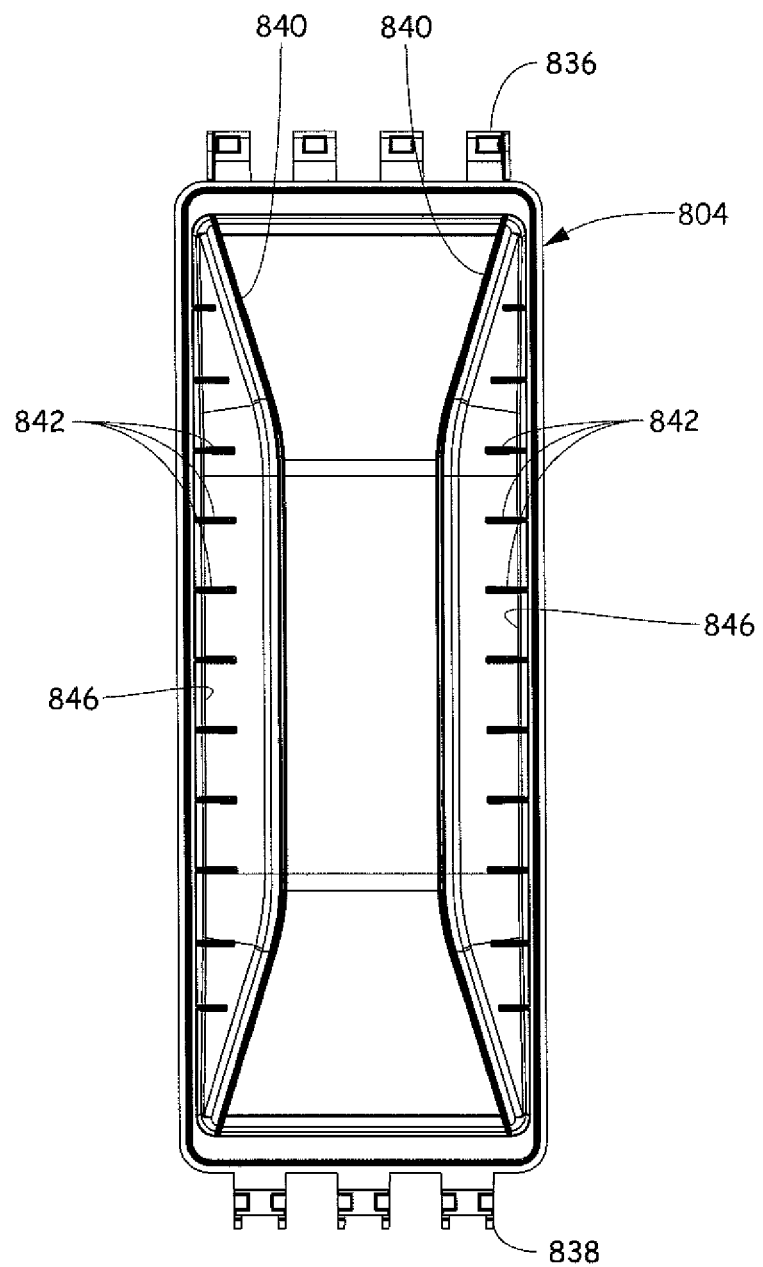
FIG. 13 is an underside view of a material container cover for a material container according to an embodiment of the present disclosure.
Figure 14:
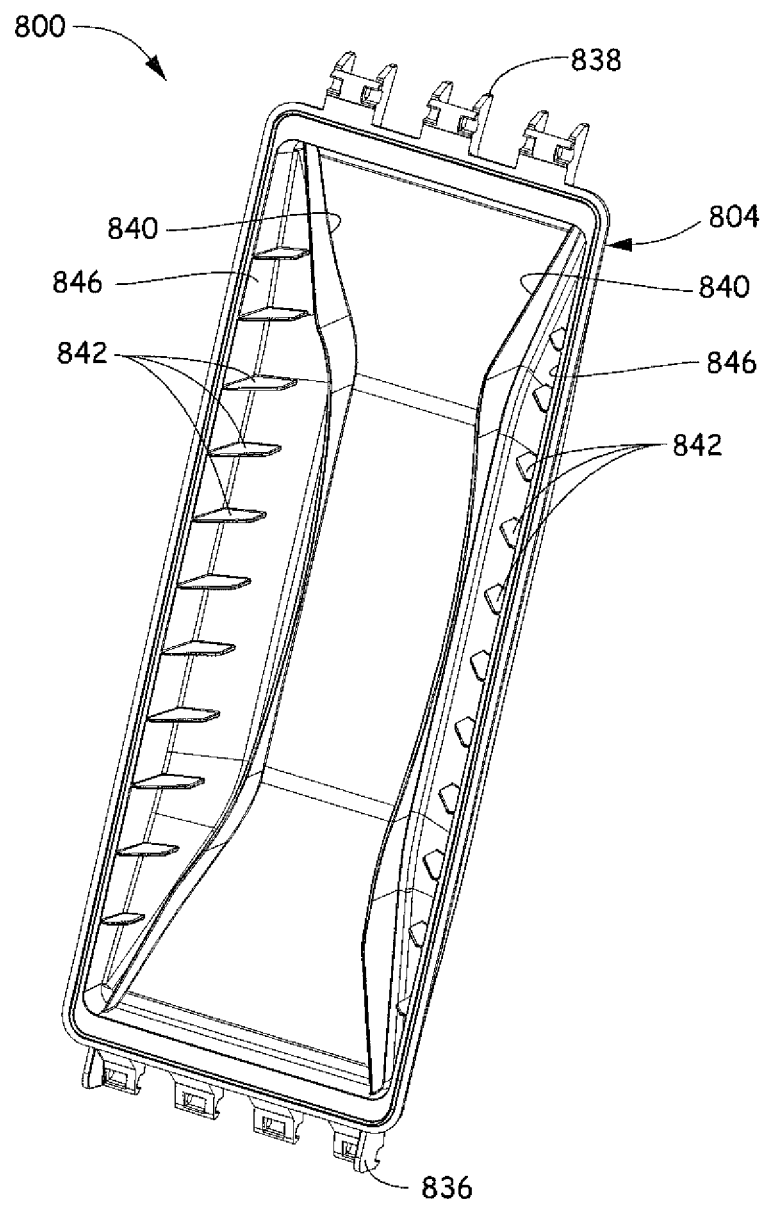
FIG. 14 is a perspective view of the material container cover of FIG. 13.

FIGS. 13 and 14 illustrate a material container cover 804 according to one embodiment of the present disclosure. Material container cover 804 is configured in one embodiment to reduce the chances of filament jumping out of the filament winding area 210. Material container cover 804 comprises curved inner guide components 840 that restrict the gap 844 between the edges of spool walls 202 and 204 and the material container cover 804 radially. Curved inner guide components 840 continue a circumferential barrier to a radius 848 that is slightly larger than a radius of the spool walls 202 and 204, thus assisting in the maintenance of a substantially uniform gap 844 around an entire rotational arc of the rotating spool 200. Further, ribs 842 extend laterally inward from the interior edges 846 of the cover 804 to assist in structural rigidity of the material container cover, and to assist in aligning the material container cover 804 with the material container body 802, therefore assisting in the alignment of curved inner guide components 840 with the radial edges of the spool walls 202 and 204.

Figure 15:
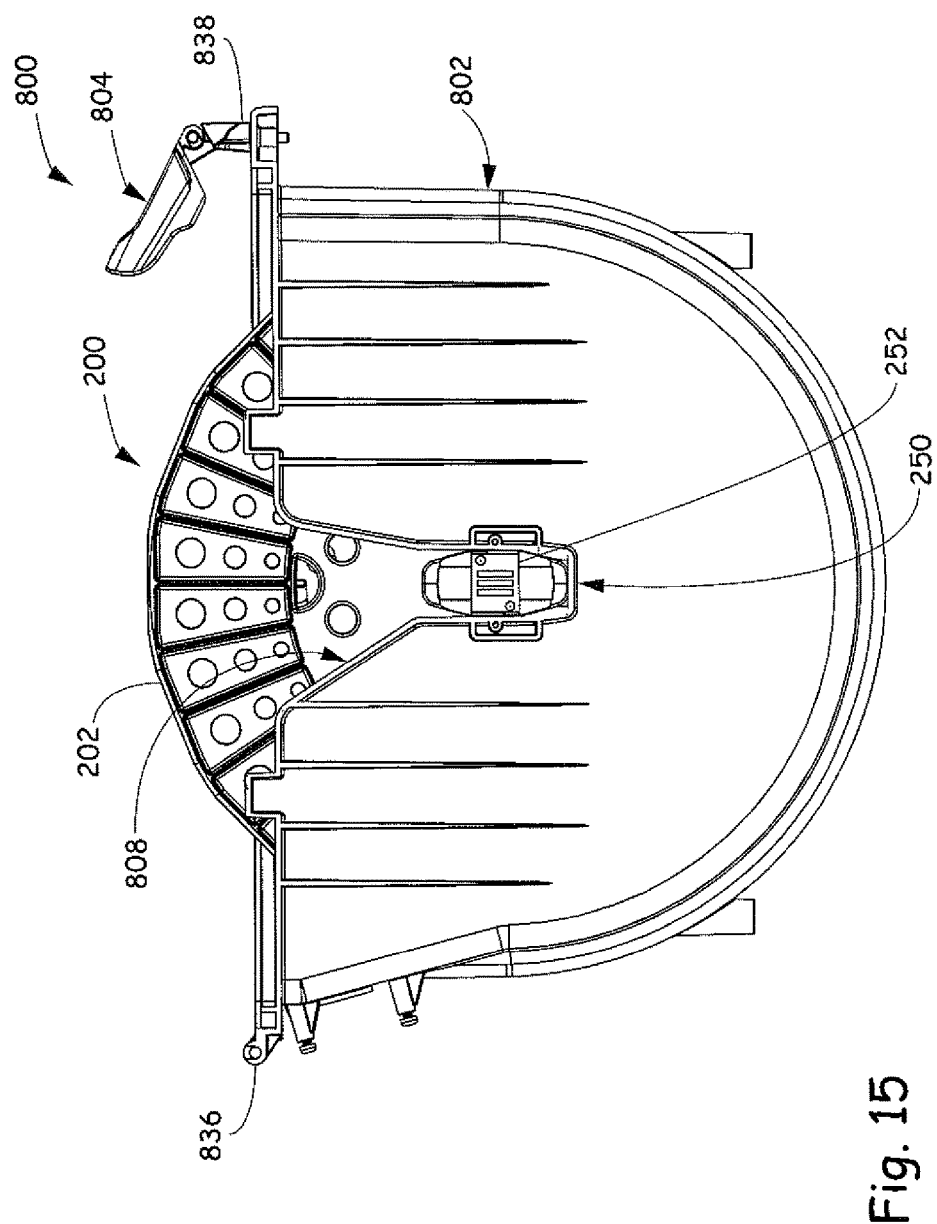
FIG. 15 is a partial cutaway view showing a spool and axle in a material container body according to an embodiment of the present disclosure.

FIG. 15 illustrates a partial cutaway view showing a spool 200 on axle 250 inserted properly into material container body 802 of material container 800. As can be seen, the end 270 of axle 250 is in proper position to align its contacts with the contacts of the material container body 802.

Figure 16:
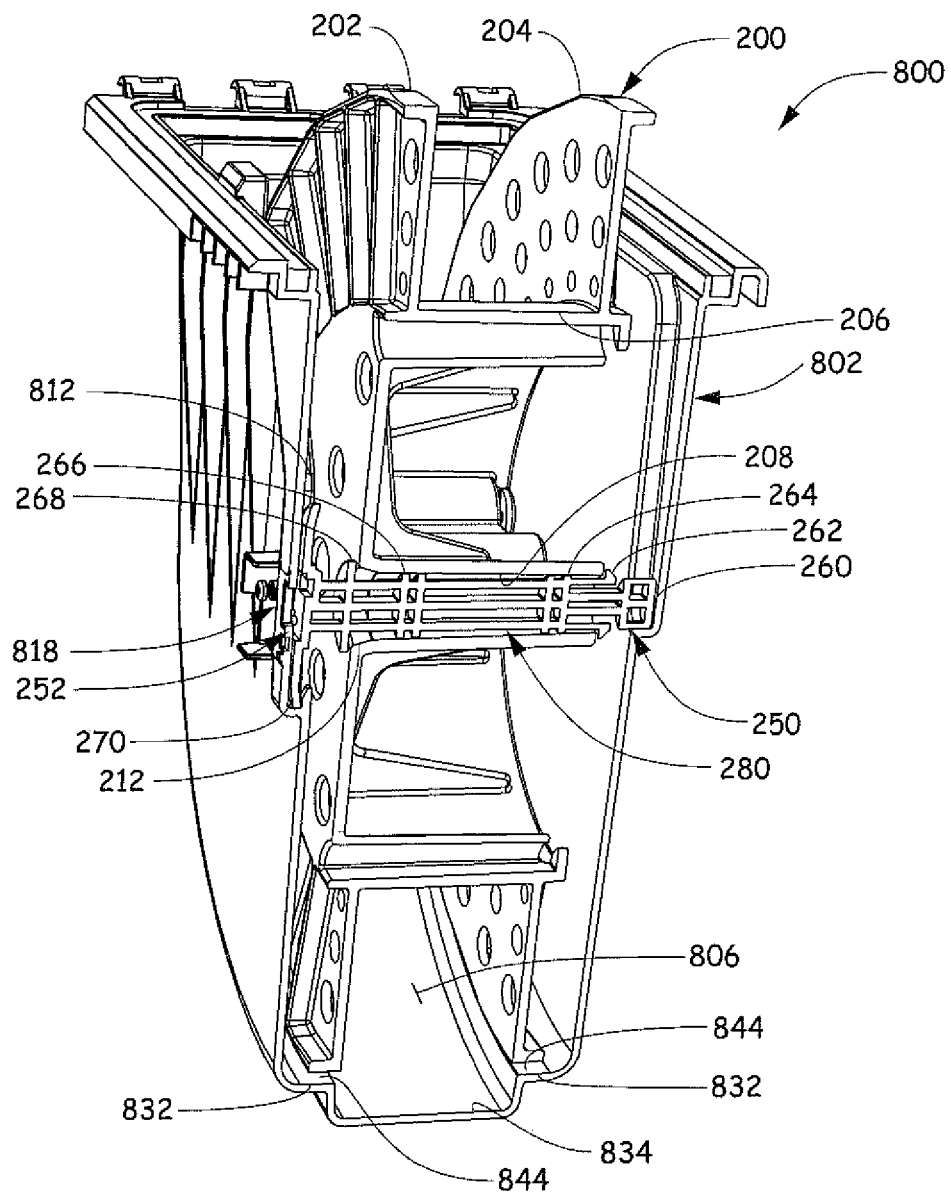
FIG. 16 is a perspective section view of a spool, axle, and material container body according to an embodiment of the present disclosure.

FIG. 16 is a perspective cutaway section view of a portion of the material container 800 showing the positioning of the spool walls 202 and 204 with respect to the well edge landings 832 and well extension 834. Gap 844 is reduced and any filament slack will move into the well extension 834 during spool 200 rotation, and not into the gap 844, as the path of least resistance.

Figure 17:
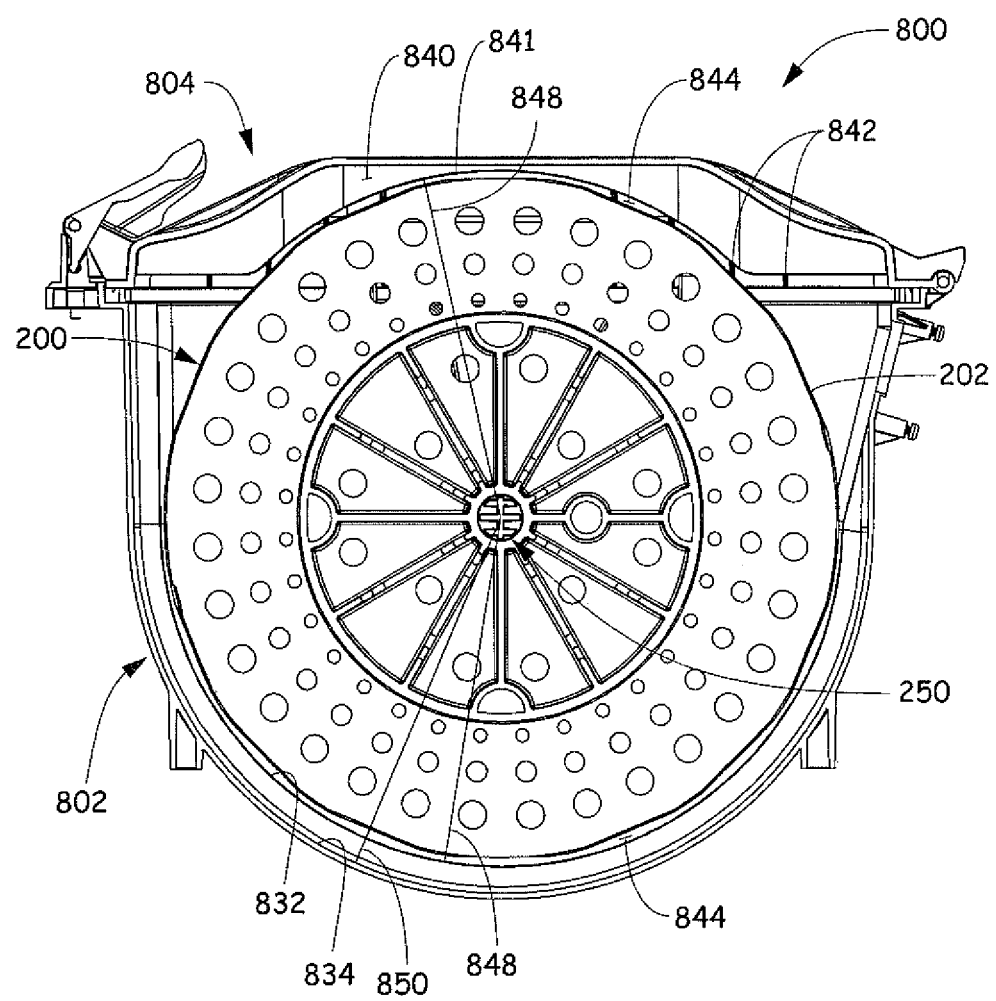
FIG. 17 is a section view of a material container, spool, and axle according to an embodiment of the present disclosure.

FIG. 17 is a section view of a material container 800, showing a spool 200 and axle 250 inserted into material container 800. The spool 200 rotates about the axle 250. Well edge landings 832 of material container body 802 combine with curved inner guide components 840 along an arc 841 thereof to provide a substantially uniform gap 844 to prevent the jumping of filament on the spool 200 over spool walls 202 or 204 into material container body 802 or material container cover 804. Arc 841 of curved inner guide components 840 is positioned at a radius 848 that is the same as radius 848 between the longitudinal axis 290 and the well edge landings 832 of material container body 802.

A method of loading three dimensional part material to a 3D printer comprises aligning a first end of an axle of a spool with a first tapered axle channel in a material well, and aligning a second end of the axle with a second tapered axle channel in the material well. Aligning a first end of an axle further comprises providing the first tapered axle channel with a top opening sized to accommodate the first end of the axle in any rotational orientation, and providing a second portion sized to accommodate the first end of the axle in a selected orientation, wherein the selected orientation is configured to align electrical contacts of the axle with corresponding electrical contacts of the first tapered axle channel.

A method of reducing snagging of a filament feed spool in a 3D printer comprises providing a material container having a material container body with an interior material well and a material container cover, aligning a plurality of cover ribs with radial edges of the filament feed spool, aligning well edge landings of the material well with the radial edges of the filament feed spool, and providing an extension well in the material well extending beyond the radial edges of the filament feed spool in a filament winding area of the filament feed spool.

While two consumable assemblies 12, in one embodiment comprising spool 200, axle 250, and material container 800, are shown and discussed herein, it should be understood that more or fewer consumable assemblies may be used without departing from the scope of the disclosure.

Although the present disclosure has been described with reference to preferred embodiments, workers skilled in the art will recognize that changes may be made in form and detail without departing from the spirit and scope of the disclosure.

The invention claimed is:

1. A 3D printer, comprising:
   a gantry configured to move in a plane substantially parallel to a build plane;
   a platen configured to support a part being built in a layer by layer process, wherein the platen is configured to move in a direction substantially normal to the build plane;
   a head carriage carried by the gantry;
   a print head carried by and retained in the head carriage; and
   a material container, comprising:
   a material container body and a material container cover, the material container body and material container cover configured to allow loading of a spool containing a supply of a consumable filament for printing with the 3D printer, the spool mounted on an axle containing a spool chip and a first plurality of electrical contacts, the material container body comprising:
      a first axle channel configured to accept a first end of the axle, and a second axle channel configured to accept a second end of the axle, the first axle channel having a different configuration than the second axle channel, the first axle channel having a second plurality of electrical contacts and being tapered to orient the axle to align the first plurality of electrical contacts with the second plurality of electrical contacts.

2. The 3D printer of claim 1, wherein a bottom of the first axle channel and a bottom of the second axle channel are each configured to accept an axle end therein and align the axle on a central longitudinal axis of the material container.

3. The 3D printer of claim 2, wherein the material container body further comprises a material well, the material well comprising:
   first and second well edge landings at a first radius from the central longitudinal axis, the first well edge landing extending from a first inner edge of the material well inwardly toward a center of the material well, the second well edge landing extending from a second, opposite, inner edge of the material well inwardly toward the center of the material well; and
   an extension well extending laterally from the first and second well edge landings to a second radius larger than the first radius.

4. The 3D printer of claim 3, wherein the extension well has a width configured to be substantially the same as a width of a filament winding area of the inserted spool.

5. The 3D printer of claim 3, wherein the first radius is substantially equal to a radius of an inserted spool.

6. The 3D printer of claim 1, wherein the material container cover further comprises:
   first and second of curved inner guide components each extending from a top inner edge of the material container cover; and
   a plurality of ribs extending laterally from each side of the material container cover and configured to align the material container cover to the material container body to align the first and second curved inner guides with the first and second well edge landings.

7. The 3D printer of claim 1, wherein the first and second plurality of electrical contacts each comprise:
   a first ground contact; and
   two electrically connected power contacts.

8. The 3D printer of claim 7, wherein the first ground contact is positioned between the two electrically connected power contacts in the first axle channel.

9. A 3D printer, comprising:
a gantry configured to move in a plane substantially parallel to a build plane;
a platen configured to support a part being built in a layer by layer process, wherein the platen is configured to move in a direction substantially normal to the build plane;
a head carriage carried by the gantry;
a print head carried by and retained in the head carriage; and
a material container, comprising:
a material container body and a material container cover, the material container body and material container cover configured to allow loading of a spool containing a supply of a consumable filament for printing with the 3D printer, the spool mounted on an axle having a longitudinal axis, wherein the spool is configured to rotate about the axle and the longitudinal axis, the material container body comprising:
a first axle channel configured to accept a first end of the axle, and a second axle channel configured to accept a second end of the axle, the first axle channel having a different configuration than the second axle channel, the first axle channel having at least one surface that is configured to engage the first end of the axle and prevent rotation of the axle about the longitudinal axis.

10. The 3D printer of claim 9, wherein the first end of the axle comprises a first plurality of electrical contacts and wherein the material container body comprises a second having a second plurality of electrical contacts within the first axle channel, wherein the first and second plurality of electrical contacts are aligned to compete a circuit.

11. The 3D printed of claim 9, wherein the first axle channel has a top entrance and bottom axle engaging end, wherein a width of the first axle channel decreases from the top entrance to the axle engaging end to align the first and second plurality of electrical contacts to complete the circuit.

12. The 3D printer of claim 9, wherein a bottom surface of the first axle channel and a second bottom of the second axle channel are each configured to accept the first and second ends of the axle, respectively, and align the longitudinal axis of the axle with a central axis of the material container.

13. The 3D printer of claim 9, wherein the material container body further comprises a material well, the material well comprising:
first and second well edge landings at a first radius from the central longitudinal axis, the first well edge landing extending from a first inner edge of the material well inwardly toward a center of the material well, the second well edge landing extending from a second, opposite, inner edge of the material well inwardly toward the center of the material well; and
an extension well extending laterally from the first and second well edge landings to a second radius larger than the first radius.

14. The 3D printer of claim 13, wherein the extension well has a width configured to be substantially the same as a width of a filament winding area of the inserted spool.

15. A 3D printer, comprising:
a gantry configured to move in a plane substantially parallel to a build plane;
a platen configured to support a part being built in a layer by layer process, wherein the platen is configured to move in a direction substantially normal to the build plane;
a head carriage carried by the gantry;
a print head carried by and retained in the head carriage; and
a material container, comprising:
a material container body and a material container cover, the material container body and material container cover configured to allow loading of a spool containing a supply of a consumable filament for printing with the 3D printer, the spool mounted on an axle having a longitudinal axis, wherein the spool is configured to rotate about the axle and the longitudinal axis, the material container body comprising:
a first axle channel configured to accept a first end of the axle, and a second axle channel configured to accept a second end of the axle, the first axle channel having a different configuration than the second axle channel, the second axle channel having a width that is less than a minimum width of the first end of the axle and the first axle channel such that improper insertion of the spool within the material container body is prevented.

16. The 3D printer of claim 15 wherein the first axle channel comprises at least one surface that is configured to engage the first end of the axle and prevent rotation of the axle about a longitudinal axis such that the spool rotates about the axle.

17. The 3D printer of claim 15, wherein the first end of the axle comprises a first plurality of electrical contacts and wherein the a material container body comprises a second having a second plurality of electrical contacts within the first axle channel, wherein the first and second plurality of electrical contacts are aligned to compete a circuit.

18. The 3D printer of claim 15, wherein the first end of the axle comprises a first plurality of electrical contacts and wherein the material container body comprises a second having a second plurality of electrical contacts within the first axle channel, wherein the first and second plurality of electrical contacts are aligned to compete a circuit.

19. The 3D printed of claim 18, wherein the first axle channel has a top entrance and bottom axle engaging end, wherein a width of the first axle channel decreases from the top entrance to the axle engaging end to align the first and second plurality of electrical contacts to complete the circuit.

* * * * *